United States Patent
Stone et al.

(10) Patent No.: US 11,113,526 B2
(45) Date of Patent: Sep. 7, 2021

(54) TRAINING METHODS FOR DEEP NETWORKS

(71) Applicant: TOYOTA RESEARCH INSTITUTE, INC., Los Altos, CA (US)

(72) Inventors: Kevin Stone, Menlo Park, CA (US); Krishna Shankar, Los Altos, CA (US); Michael Laskey, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 80 days.

(21) Appl. No.: 16/570,813

(22) Filed: Sep. 13, 2019

(65) Prior Publication Data
US 2021/0027097 A1      Jan. 28, 2021

Related U.S. Application Data

(60) Provisional application No. 62/877,792, filed on Jul. 23, 2019, provisional application No. 62/877,791, (Continued)

(51) Int. Cl.
*G06T 7/73* (2017.01)
*G06K 9/62* (2006.01)
*B25J 9/16* (2006.01)
*G06K 9/00* (2006.01)
(Continued)

(52) U.S. Cl.
CPC ........ *G06K 9/00664* (2013.01); *B25J 9/1605* (2013.01); *B25J 9/1661* (2013.01); *B25J 9/1664* (2013.01); *B25J 9/1671* (2013.01); *B25J 9/1697* (2013.01); *G06K 9/6202* (2013.01); *G06K 9/6255* (2013.01); *G06K 9/6256* (2013.01);
(Continued)

(58) Field of Classification Search
CPC combination set(s) only.
See application file for complete search history.

(56) References Cited

U.S. PATENT DOCUMENTS 10,332,261 B1 *  6/2019  Farivar ................... G06T 7/174
10,607,079 B2 *  3/2020  Northcutt ........... G06K 9/00369
(Continued)

FOREIGN PATENT DOCUMENTS

CN       106023211 A     10/2016
WO     2019079895 A1      5/2019

OTHER PUBLICATIONS

Wu, Jiajun, et al., "Single Image 3D Interpreter Network", European Conference on Computer Vision (ECCV), Oct. 11-14, 2016, pp. 365-382, Amsterdam, The Netherlands.

*Primary Examiner* — Tsung Yin Tsai
(74) *Attorney, Agent, or Firm* — Seyfarth Shaw LLP

(57) ABSTRACT

A method for training a deep neural network of a robotic device is described. The method includes constructing a 3D model using images captured via a 3D camera of the robotic device in a training environment. The method also includes generating pairs of 3D images from the 3D model by artificially adjusting parameters of the training environment to form manipulated images using the deep neural network. The method further includes processing the pairs of 3D images to form a reference image including embedded descriptors of common objects between the pairs of 3D images. The method also includes using the reference image from training of the neural network to determine correlations to identify detected objects in future images.

18 Claims, 6 Drawing Sheets

Related U.S. Application Data filed on Jul. 23, 2019, provisional application No. 62/877,793, filed on Jul. 23, 2019.

(51) Int. Cl.
  *G06T 7/55* (2017.01)
  *G06N 3/08* (2006.01)
  *G06T 19/20* (2011.01)

(52) U.S. Cl.
  CPC ............... *G06N 3/08* (2013.01); *G06T 7/55* (2017.01); *G06T 7/74* (2017.01); *G06T 19/20* (2013.01); *B25J 9/163* (2013.01); *G06T 2200/04* (2013.01); *G06T 2207/10016* (2013.01); *G06T 2207/10024* (2013.01); *G06T 2207/10028* (2013.01); *G06T 2207/20104* (2013.01)

(56) References Cited

U.S. PATENT DOCUMENTS

| | | | |
|---|---|---|---|
| 10,824,923 B1* | 11/2020 | Forster | G06K 9/6256 |
| 2008/0187174 A1 | 8/2008 | Metaxas et al. | |
| 2011/0243390 A1* | 10/2011 | Eggert | G06T 7/269 |
| | | | 382/107 |
| 2016/0180195 A1 | 6/2016 | Martinson et al. | |
| 2016/0275376 A1 | 9/2016 | Kant | |
| 2017/0323376 A1* | 11/2017 | Glaser | G06Q 20/203 |
| 2018/0039848 A1* | 2/2018 | Konolige | G06T 7/344 |
| 2019/0102601 A1* | 4/2019 | Karpas | G06F 30/23 |
| 2019/0392630 A1* | 12/2019 | Sturm | G06K 9/6272 |
| 2020/0089954 A1* | 3/2020 | Zia | G06K 9/00671 |

* cited by examiner

TRAINING METHODS FOR DEEP NETWORKS

CROSS-REFERENCE TO RELATED APPLICATION

The present application claims the benefit of U.S. Provisional Patent Application No. 62/877,792, filed on Jul. 23, 2019, and titled "KEYFRAME MATCHER," U.S. Provisional Patent Application No. 62/877,791, filed on Jul. 23, 2019, and titled "VISUAL TEACH AND REPEAT FOR MANIPULATION—TEACHING VR," and U.S. Provisional Patent Application No. 62/877,793, filed on Jul. 23, 2019, and titled "VISUALIZATION," the disclosures of which are expressly incorporated by reference in their entirety.

BACKGROUND

Field

Certain aspects of the present disclosure generally relate to object detection training and, more particularly, to a system and method for training deep networks.

Background

A robotic device may use one or more sensors (e.g., as a camera) to identify objects in an environment based on training of the robotic device using real world images. In real life situations, however, encountered images may vary from the real images used to train the robotic device. That is, variations in deformation, object articulation, viewing angle, and lighting from the image data used for training may prevent object detection during real world operation.

Conventional systems collect real world training images under actual conditions from which observation is expected. For example, training of the robotic device is limited to the actual conditions used to collect the training images, including the actual lighting levels, and the particular angles when the training images were collected. These conventional systems do not account for variations in the environment. These variations between training data and real world objects is especially problematic when training a deep neural network of a robotic device to perform object detection.

SUMMARY

A method for training a deep neural network of a robotic device is described. The method includes constructing a 3D model using images captured via a 3D camera of the robotic device in a training environment. The method also includes generating pairs of 3D images from the 3D model by artificially adjusting parameters of the training environment to form manipulated images using the deep neural network. The method further includes processing the pairs of 3D images to form a reference image including embedded descriptors of common objects between the pairs of 3D images. The method also includes using the reference image from training of the neural network to determine correlations to identify detected objects in future images.

A method for controlling a robotic device based on identification of detected objects in an unknown environment is described. The method includes detecting an object in the unknown environment. The method also includes selecting a corresponding reference image including embedded descriptors corresponding to trained objects manipulated according to artificially adjusting parameters of an image capture environment. The method further includes identifying the detected object according to the embedded descriptors of the corresponding reference image.

A system for controlling a robotic device based on identification of detected objects in an unknown environment is described. The system includes a pre-trained, object identification module. The object identification module is configured to select a corresponding reference image to identify a detected object in a captured image. The corresponding reference image including embedded descriptors based on trained objects manipulated according to artificially adjusted parameters of an image capture environment. The system also includes a controller configured to select an autonomous behavior of the robotic device based on an identity of the detected object.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

A robotic device may use one or more sensors to identify objects in an environment. The sensors may include a red-green-blue (RGB) camera, radio detection and ranging (RADAR) sensor, light detection and ranging (LiDAR) sensor, or another type of sensor. In an image captured by a sensor, one or more objects are identified by the robotic device based on training of a deep neural network of the robotic device to perform object detection. In real life situations, however, encountered images may vary from the real images used to train the robotic device. That is, variations in deformation, object articulation, viewing angle, and lighting within the image data used for training may prevent object detection during real world operation.

Conventional systems collect real world training images under actual conditions from which observation is expected. For example, the actual conditions for collecting training images include the actual lighting levels, and the particular angles when the training images were collected. These conventional systems do not account for variations in the environment. These variations between training data and real world objects is especially problematic when training a deep neural network of a robotic device to perform object detection.

The present disclosure is directed to providing data for training a deep network by accounting for variations in an environment. The variations include, for example, object deformation, object articulation, changes in viewing angles, and/or changes in lighting.

In the current disclosure, for simplicity, a robotic device may be referred to as a robot. Additionally, the objects may include stationary and dynamic objects in an environment. The objects may include man-made objects (e.g., chairs, desks, cars, books, etc.), natural objects (e.g., rocks, trees, animals, etc.), and humans.

Figure 1:
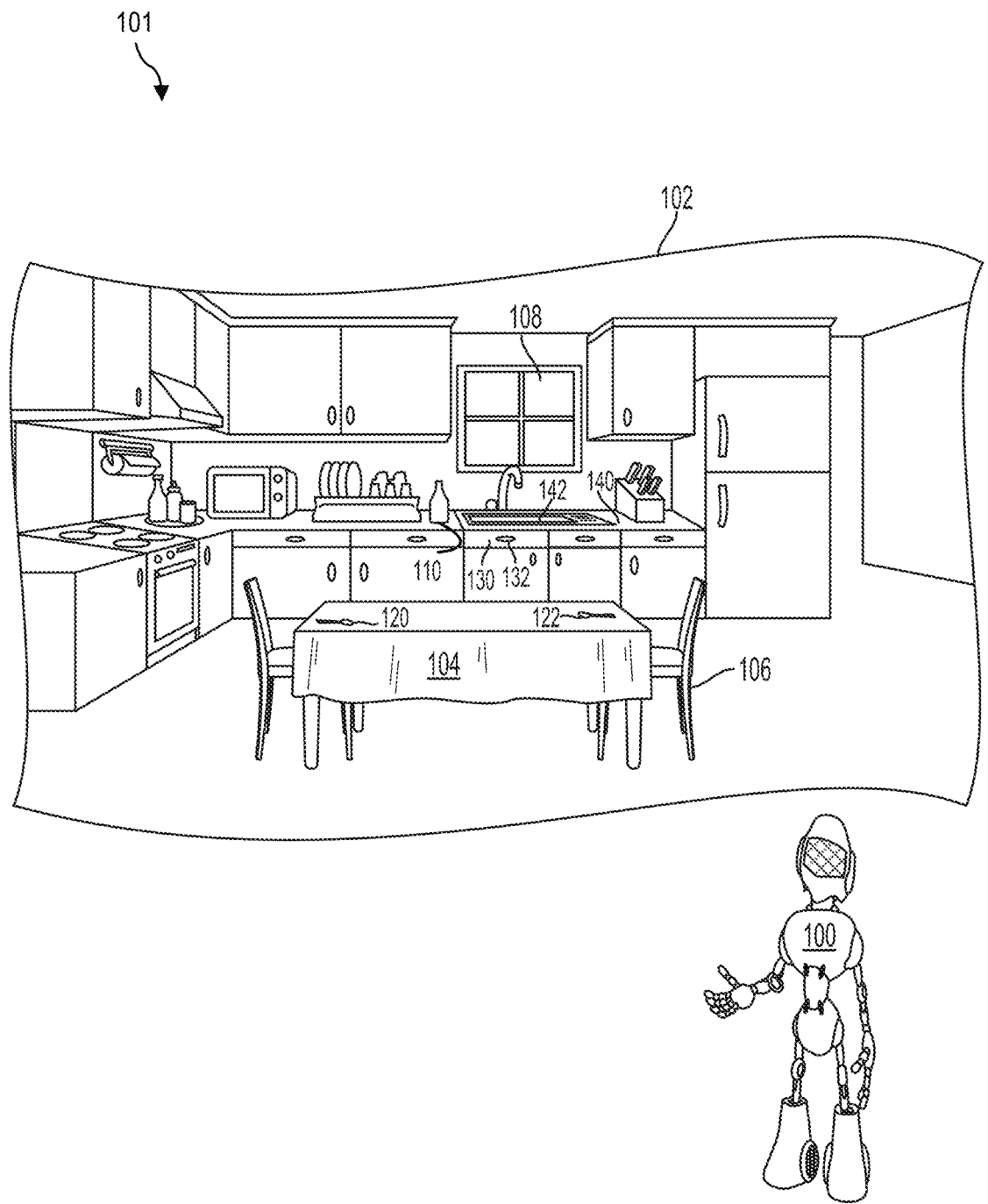
FIG. 1 illustrates an original image of an environment used to train a robot, according to aspects of the present disclosure.

FIG. 1 illustrates an original image 101 of a training environment 102 used to train a robot 100, according to aspects of the present disclosure. In the example of FIG. 1, the robot 100 is a humanoid robot and the training environment 102 is a kitchen. Aspects of the present disclosure are not limited to a humanoid robot. The robot 100 may be any type of autonomous or semi-autonomous device, such as a drone or a vehicle. Additionally, the robot 100 may be in any type of environment.

In one configuration, the robot 100 obtains the original image 101 of the training environment 102 via one or more sensors of the robot 100. The robot 100 may detect and localize one or more objects in the original image 101. Localization refers to determining the location (e.g., coordinates) of a detected object within the original image 101. In conventional object detection systems, a bounding box may be used to indicate the location of an object detected in the original image 101. The detected objects may be one or more specific classes of objects, such as a table 104, a pushed-in chair 106, a closed window 108, a bottle 110, utensils 120 and 122, a counter 140, a sink 142, a cabinet 130 having a handle 132, or all objects in the original image 101. The objects may be detected and identified using an object detection system, such as a pre-trained object detection neural network.

In one configuration, a 3D camera on the robot 100 captures images of the training environment 102 from different views/angles. A 3D model of the training environment 102 is generated from the captured images. The 3D model is used to create images from viewpoints that differ from the viewpoints of the original image 101 captured by the 3D camera. The 3D model is also used to vary lighting conditions (e.g., adjusting the light level) in the created images. Additionally, the 3D model may create images with manipulated objects. For example, the 3D model may create scenes where drawers/windows are opened or closed. Additionally, the system links images with common features. The captured images and the images created by the 3D model (e.g., training data) are used to train a deep network object detection system.

Figure 2:
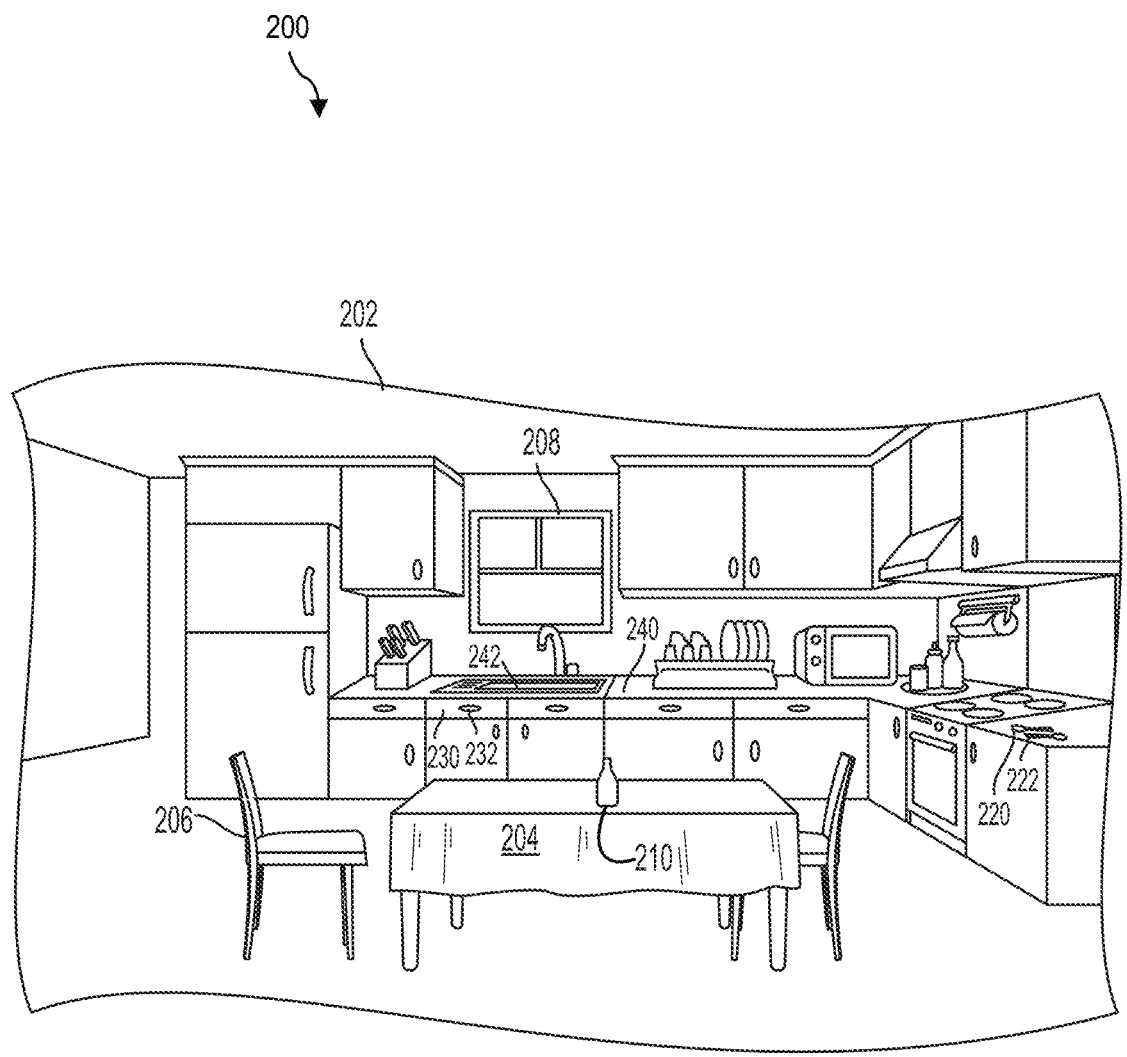
FIG. 2 illustrates an example of a manipulated image created using a 3D model to train a robot in a training environment, according to aspects of the present disclosure.
Figure 2:
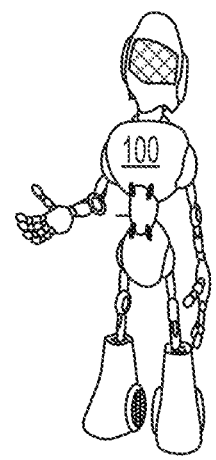

FIG. 2 illustrates an example of a manipulated image 200 created by a 3D model to train the robot 100 in a training environment 202, according to aspects of the present disclosure. In the example of FIG. 2, the training environment 202 is the kitchen of FIG. 1, generated with the elements flipped in a horizontal direction to provide a different viewing angle. The robot 100 may detect and identify objects in each image via an object detection system, such as a pre-trained object detection neural network using the original image 101 of FIG. 1 and the manipulated image 200.

In this configuration, the system generates the manipulated image 200 and pairs the manipulated image 200 with the original image 101 of the training environment 102 shown in FIG. 1. According to aspects of the present disclosure linked elements are identified between the original image 101 and the manipulated image 200. That is, each element of the training environment 202 may be given a pixel coordinate. The overlapping pixel coordinates indicate an overlapping portion (e.g., a linked element). As an example, a pulled-out chair 206 is a linked element between the manipulated image 200 and the pushed-in chair 106 of the original image 101. The linking indicates that the same element is depicted with different articulations. The linked portions may be defined by point correspondences within the original image 101 and the manipulated image 200 (e.g., with the same viewpoint as the original image 101).

In this example, the closed window 108 of the original image 101 is paired with the open window 208 of the manipulated image 200. For example, a pane of the open window 208 is linked between the original image 101 and the manipulated image 200. In addition, the table 204 in the manipulated image 200 is also linked to the table 104 in the original image 101. Similarly, the bottle 210 in the manipulated image 200 is linked to the bottle 110 in the original image 101. The bottle 110 is placed on a counter 240 that is linked to the counter 140 in the original image 101. The sink 242 is also linked between the manipulated image 200 and the original image 101. In addition, the cabinet 230 and the handle 232 of the manipulated image 200 are also linked with the cabinet 130 and the handle 132 of the original image 101.

The robot 100 is trained to detect the pulled-out chair 206, which is flipped horizontally from the pushed-in chair 106 shown in FIG. 1. Similarly, the robot is 100 is trained to track the bottle 210, which is moved from the counter 240 and placed on the table 204. In addition, the robot 100 is trained to track the area of the utensils 220 and 222, which are moved from the table 204 to the counter 240. Although the original image 101 and the manipulated image 200 are shown, it should be recognized that aspects of the present disclosure, including generating additional manipulated images with varying lighting conditions, viewing angles, deformations, and the like are possible.

According to aspects of the present disclosure, the paired images of the 3D environment are processed by an image-to-image neural network. The network receives an RGB image as an input and outputs an embedding or descriptor image, including values assigned to each pixel. The embedding/descriptor image may encode information into a series of numbers to provide numerical "fingerprint" for differentiating one feature from another. Ideally this information would be invariant under image transformation. Unfortunately, conventional feature descriptors are not invariant under image transformation because conventional systems are generally trained without accounting for variations in the environment.

In this aspect of the present disclosure, the embedding/descriptor image determines correlations to future images (e.g., images captured in real time when the robot 100 operates) that define objects and points in the environment. That is, after training, when placed in a new environment, the robot identifies locations in a new environment that may be manipulated, such as chairs, windows, bottles, utensils (e.g., spoons), cabinets, etc. The robot 100 may also identify various elements regardless of the deformation, object articulation, angle, and lighting. For example, an object detected in a different poses from the original image 101 is readily identified based on a linked element to a descriptor image formed from the paired images (e.g., the original image 101 and manipulated image 200).

Figure 3A:
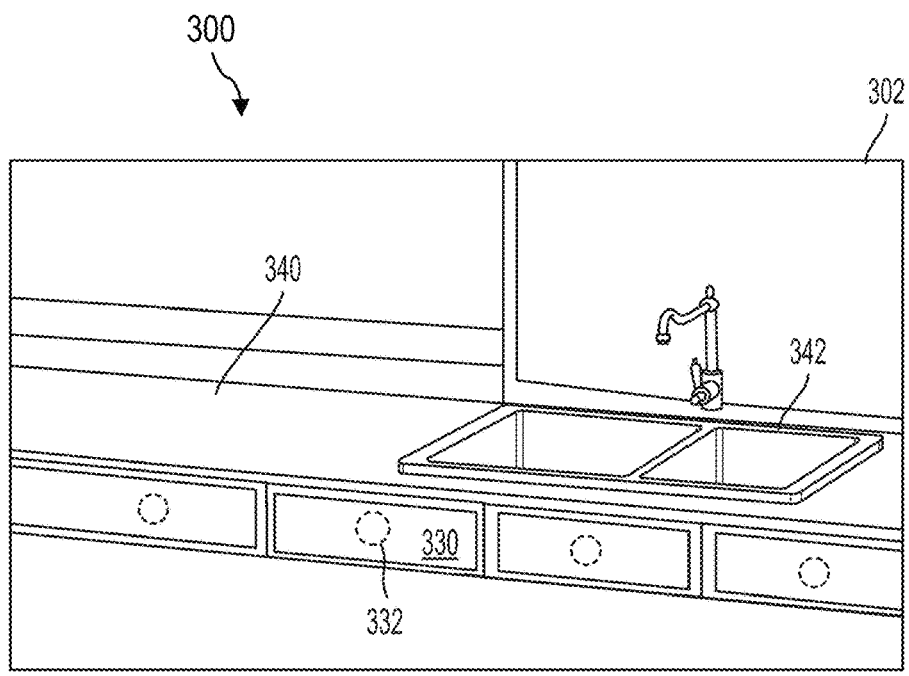
FIGS. 3A and 3B illustrate paired images of a training environment generated to train the robot, according to aspects of the present disclosure.
Figure 3A:
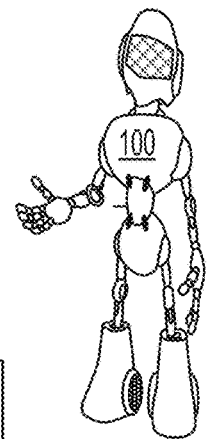
Figure 3B:
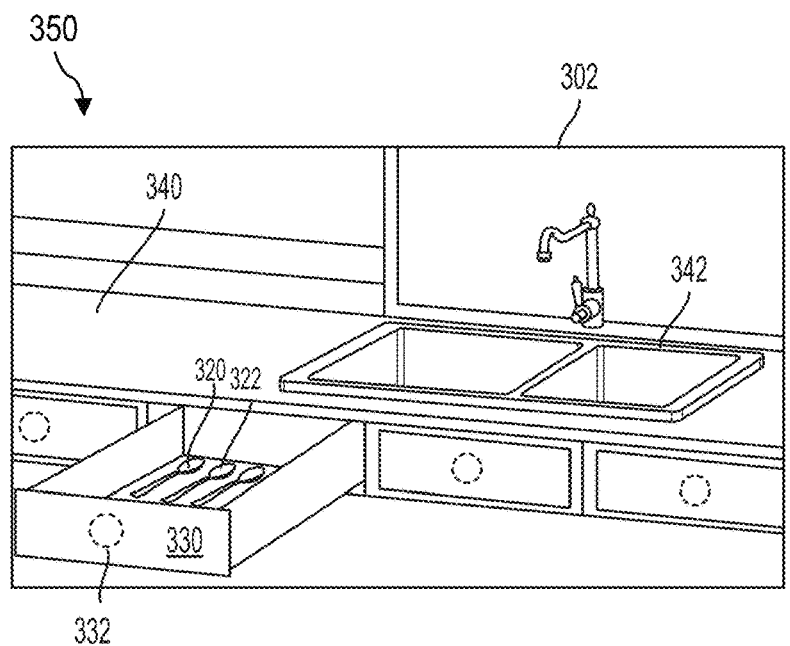

FIGS. 3A and 3B illustrate paired images of a training environment 302 generated to train the robot 100, according to aspects of the present disclosure. As shown in FIGS. 3A and 3B, a training system automatically generates pairs of images, in which the same elements in the varied images are linked. For example, FIG. 3A illustrates an original image 300 of a training environment 302. The original image 300 further illustrates a counter 340, a sink 342, and a cabinet 330 including a handle 332. In this example, the cabinet 330 is closed.

FIG. 3B illustrates a manipulated image 350 of the training environment 302, according to aspects of the present disclosure. In this example, a handle 332 of a cabinet 330 in a scene where the cabinet 330 is closed (e.g., FIG. 3A) is paired to a scene where the cabinet 330 is open. In addition, the utensils 320 and 322 are paired between the original image 300 (e.g., inside the cabinet 330) and the manipulated image 350 (e.g., showing the cabinet 330 when open). This pairing of the original image 300 and the manipulated image 350 links objects together that are the same element but depicted with different articulations. The linked portions are defined by point correspondences within the manipulated image 350 and the original image 300. The corresponding elements between the paired images may be determined through identifying overlapping portions of a training environment 302 that is captured in each image (i.e., a scene).

The pairs of images are then processed by an image-to-image neural network that receives an RGB image as an input and outputs an embedding or descriptor image composed of values assigned to each pixel of the image. According to aspects of the present disclosure, the embeddings are used to determine correlations to future images (e.g., images captured in real time when a robot operates). For example, the embeddings may define objects and points in the environment to identify correlated objects. In other words, the system can quickly determine locations in an environment through the correlation of the embeddings to real time images to identify objects, for example, as shown in FIGS. 4A and 4B.

Figure 4A:
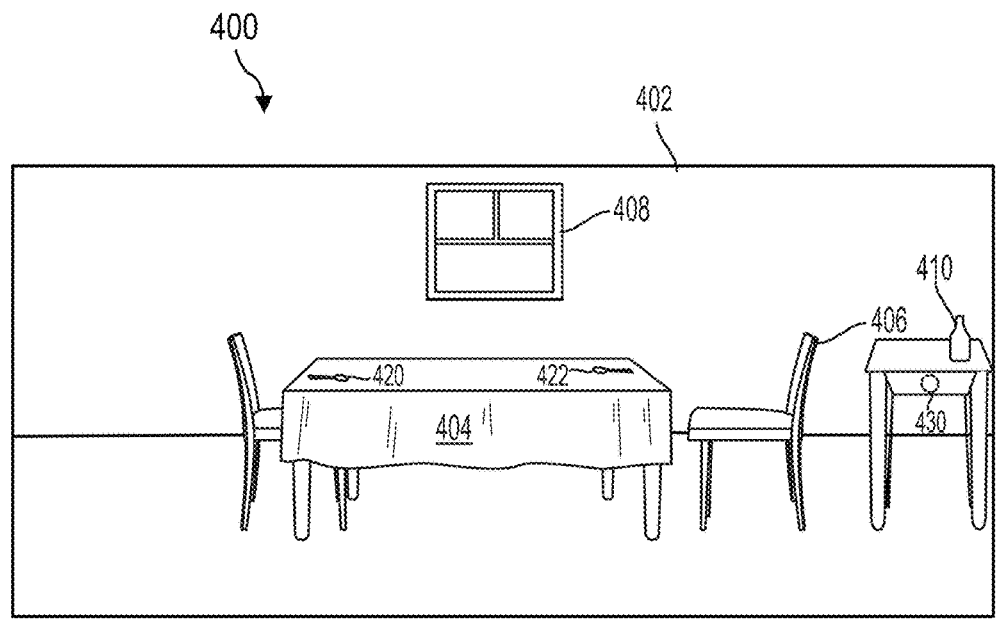
FIGS. 4A and 4B illustrate captured images of a real world environment captured by the robot, according to aspects of the present disclosure.
Figure 4B:
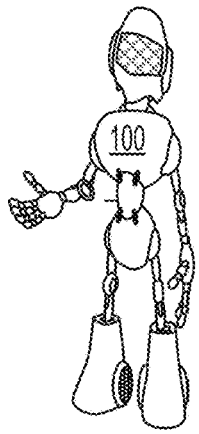
Figure 4B:
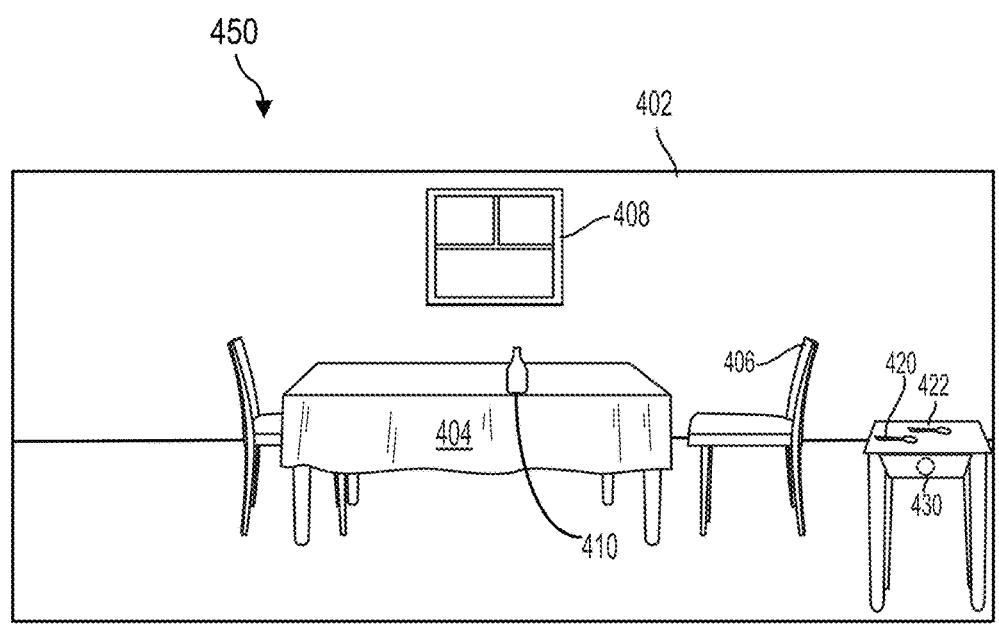

FIGS. 4A and 4B illustrate captured images of an unknown environment 402 captured by the robot 100, according to aspects of the present disclosure. In the example of FIGS. 4A and 4B, the unknown environment 402 is a restaurant, including a table 404, a pulled-out chair 406, and an open window 408, a bottle 410, utensils 420 and 422, and a cabinet 430. In one configuration, the robot 100 uses a reference image based on the pairing of original images and manipulated images of a training environment, such as the training environment of the kitchen shown in FIGS. 1, 2, 3A, and 3B. Using the reference image, the robot 100 detects the pulled-out chair 406 using a pre-trained object detection neural network. In addition, the reference image enables the robot 100 to detect the open window 408.

FIG. 4A illustrates a captured image 400 of an unknown environment 402 captured by the 3D camera of the robot 100, according to aspects of the present disclosure. In the example of FIG. 4A, the unknown environment 402 is a restaurant, including a table 404, a pulled-out chair 406, and an open window 408. In one configuration, the robot 100 uses a reference image based on an image pairing of a training environment, such as the training environments of the kitchen shown in FIGS. 1, 2, 3A, and 3B. Using the reference image, the robot 100 localizes the pulled-out chair 406 using a pre-trained object detection neural network. In addition, the reference image enables the robot 100 to identify the open window 408.

As further illustrated in FIG. 4A, a reference image enables the robot 100 to detect the utensils 420 and 422 on the table 404. In addition, the reference image enables the robot 100 to detect the bottle 410 on the cabinet 430. The detection is not limited by the location in the environment and/or an object's pose. According to aspects of the preset disclosure, the robot 100 is trained to track movement of objects over time. For simplicity, kitchen items are used as examples of detected objects. Still, aspects of the present disclosure are not limited to detecting kitchen items and are contemplated for other objects.

FIG. 4B illustrates an image 450 of an unknown environment 402 captured by the 3D camera of the robot 100, according to aspects of the present disclosure. In the example of FIG. 4B, the unknown environment 402 is also a restaurant, including the table 404, the pulled-out chair 406, the open window 408, and the cabinet 430. In one configuration, the robot 100 uses a reference image to track the utensils 420 and 422 as well as the bottle 410. Using a pre-trained object detection neural network, the robot 100 is able to track movement of the utensils 420 and 422 and the bottle 410. That is, the bottle 410 moves from the cabinet 430 to the table 404 between FIG. 4A and FIG. 4B. Similarly, the utensils 420 and 422 move from the table 404 to the cabinet 430 between FIG. 4A and FIG. 4B.

According to aspects of the present disclosure, a pre-trained object detection neural network uses embeddings (e.g., object descriptors) to determine correlations to future images (e.g., images captured in real time when the robot 100 operates) that define objects and points in the environment. In other words, the system can quickly determine locations in an unknown environment through the correlation of the embeddings to real time images. The present disclosure provides methods for generating and training deep networks by collecting training images using a 3D camera and artificially adjusting lighting levels and automatically creating pairs of images where common features are linked together. As a result, object detection in unknown environments is not limited by the pose or location of the object in the unknown environment.

Figure 5:
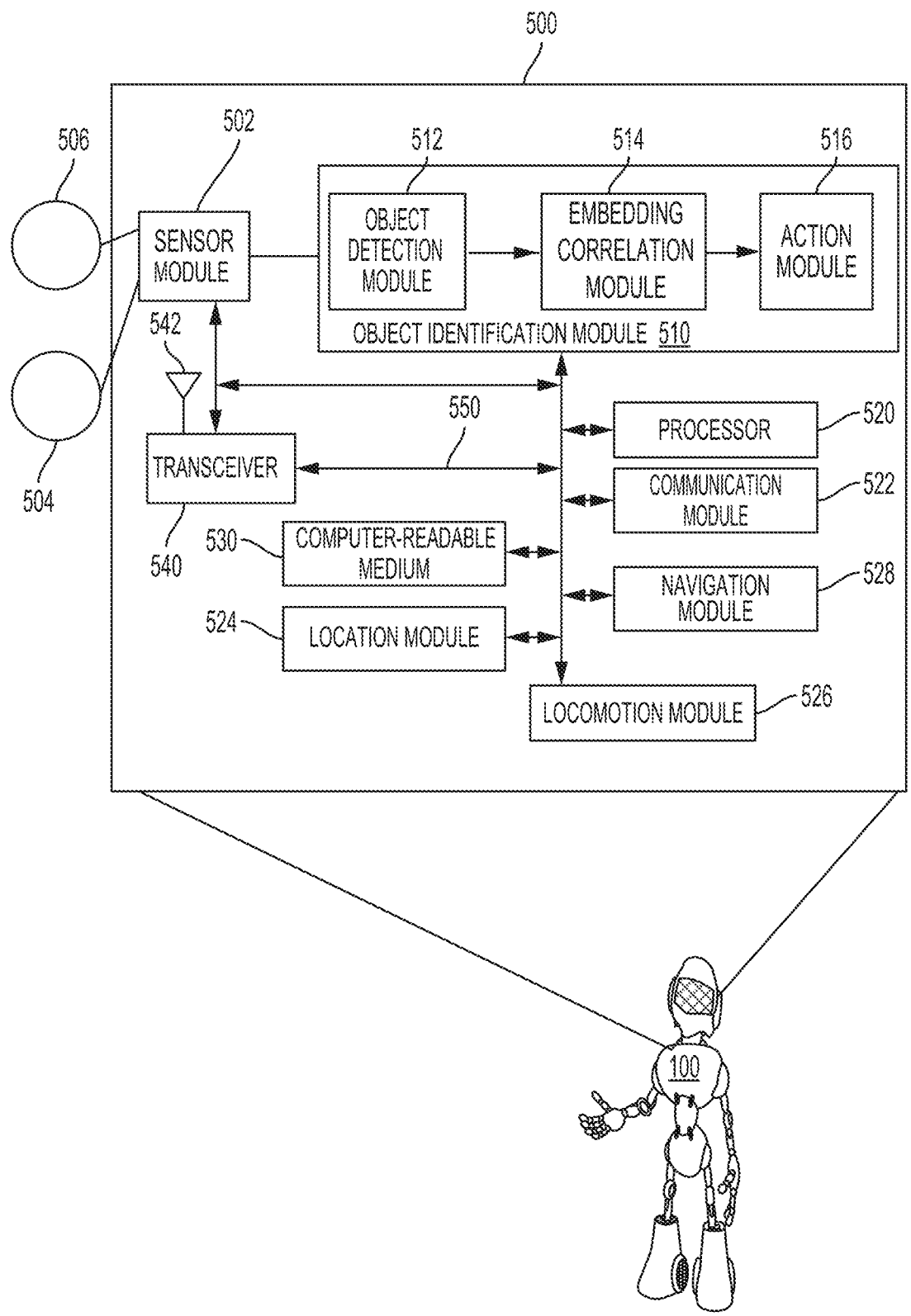
FIG. 5 is a diagram illustrating an example of a hardware implementation for an object identification system, according to aspects of the present disclosure.

FIG. 5 is a diagram illustrating an example of a hardware implementation for an object identification system 500, according to aspects of the present disclosure. The object identification system 500 may be a component of a vehicle, a robotic device, or another device. For example, as shown in FIG. 5, the object identification system 500 is a component of the robot 100 (e.g., robotic device).

Aspects of the present disclosure are not limited to the object identification system 500 being a component of the robot 100. Other devices, such as a bus, boat, drone, or vehicle, are also contemplated for using the object identification system 500. The robot 100 may operate in at least an autonomous operating mode and a manual operating mode.

The object identification system 500 may be implemented with a bus architecture, represented generally by a bus 550. The bus 550 may include any number of interconnecting buses and bridges depending on the specific application of the object identification system 500 and the overall design constraints. The bus 550 links together various circuits including one or more processors and/or hardware modules, represented by a processor 520, a communication module 522, a location module 524, a sensor module 502, a locomotion module 526, a navigation module 528, and a computer-readable medium 530. The bus 550 may also link various other circuits such as timing sources, peripherals, voltage regulators, and power management circuits, which are well known in the art, and therefore, will not be described any further.

The object identification system 500 includes a transceiver 540 coupled to the processor 520, the sensor module 502, an object identification module 510, the communication module 522, the location module 524, the locomotion module 526, the navigation module 528, and the computer-readable medium 530. The transceiver 540 is coupled to an antenna 542. The transceiver 540 communicates with various other devices over a transmission medium. For example, the transceiver 540 may receive commands via transmissions from a user or a remote device. As another example, the transceiver 540 may transmit statistics and other information from the object identification module 510 to a server (not shown).

The object identification system 500 includes the processor 520 coupled to the computer-readable medium 530. The processor 520 performs processing, including the execution of software stored on the computer-readable medium 530 to provide functionality according to the disclosure. The software, when executed by the processor 520, causes the object identification system 500 to perform the various functions described for a particular device, such as the robot 100, or any of the modules 502, 510, 512, 514, 516, 522, 524, 526, and 528. The computer-readable medium 530 may also be used for storing data that is manipulated by the processor 520 when executing the software.

The sensor module 502 may be used to obtain measurements via different sensors, such as a first sensor 504 and a second sensor 506. The first sensor 504 may be a vision sensor, such as a stereoscopic camera or a red-green-blue (RGB) camera, for capturing 3D images. The second sensor 506 may be a ranging sensor, such as a light detection and ranging (LiDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the first sensor 504 and the second sensor 506.

The measurements of the first sensor 504 and the second sensor 506 may be processed by one or more of the processor 520, the sensor module 502, the object identification module 510, the communication module 522, the location module 524, the locomotion module 526, the navigation module 528, in conjunction with the computer-readable medium 530 to implement the functionality described herein. In one configuration, the data captured by the first sensor 504 and the second sensor 506 may be transmitted to an external device via the transceiver 540. The first sensor 504 and the second sensor 506 may be coupled to the robot 100 or may be in communication with the robot 100.

The location module 524 may be used to determine a location of the robot 100. For example, the location module 524 may use a global positioning system (GPS) to determine the location of the robot 100. The communication module 522 may be used to facilitate communications via the transceiver 540. For example, the communication module 522 may be configured to provide communication capabilities via different wireless protocols, such as Wi-Fi, long term evolution (LTE), 5G, etc. The communication module 522 may also be used to communicate with other components of the robot 100 that are not modules of the object identification system 500.

The locomotion module 526 may be used to facilitate locomotion of the robot 100. As another example, the locomotion module 526 may be in communication with one or more power sources of the robot 100, such as a motor and/or batteries. The locomotion may be proved via wheels, moveable limbs, propellers, treads, fins, jet engines, and/or other sources of locomotion.

The object identification system 500 also includes the navigation module 528 for planning a route or controlling the locomotion of the robot 100, via the locomotion module 526. A route may be planned based on data provided via the object identification module 510. The modules may be software modules running in the processor 520, resident/stored in the computer-readable medium 530, one or more hardware modules coupled to the processor 520, or some combination thereof.

The object identification module 510 may be in communication with the sensor module 502, the transceiver 540, the processor 520, the communication module 522, the location module 524, the locomotion module 526, the navigation module 528, and the computer-readable medium 530. In one configuration, the object identification module 510 receives sensor data from the sensor module 502. The sensor module 502 may receive the sensor data from the first sensor 504 and the second sensor 506. According to aspects of the present disclosure, the sensor module 502 may filter the data to remove noise, encode the data, decode the data, merge the data, extract frames, or perform other functions. In an alternate configuration, the object identification module 510 may receive sensor data directly from the first sensor 504 and the second sensor 506.

In one configuration, the object identification module 510 identifies detected objects based on information from the processor 520, the location module 524, the computer-readable medium 530, the first sensor 504, and/or the second sensor 506. The identification of the detected objects from the object detection module 512 may be performed using the embedding correlation module 514. Based on the identified objects, the object identification module 510 may control one or more actions of the robot 100 through the action module 516.

For example, the action may be tracking a moving object between various images of scenes captured by the robot 100 and performing a security action, such as contact a security service. The object identification module 510 may perform the action via the processor 520, the location module 524, the communication module 522, the computer-readable medium 530, the locomotion module 526, and/or the navigation module 528.

In this aspect of the present disclosure, the embedding correlation module 514 using the embedding/descriptor image from training to determine correlations to future images that define objects and points in an unknown environment. That is, after training, when placed in a new environment, the robot 100 identifies locations in a new environment that may be manipulated, such as chairs, windows, bottles, utensils (e.g., spoons), cabinets, etc. The robot 100 may also identify various elements regardless of the deformation, object articulation, angle, and lighting.

Figure 6:
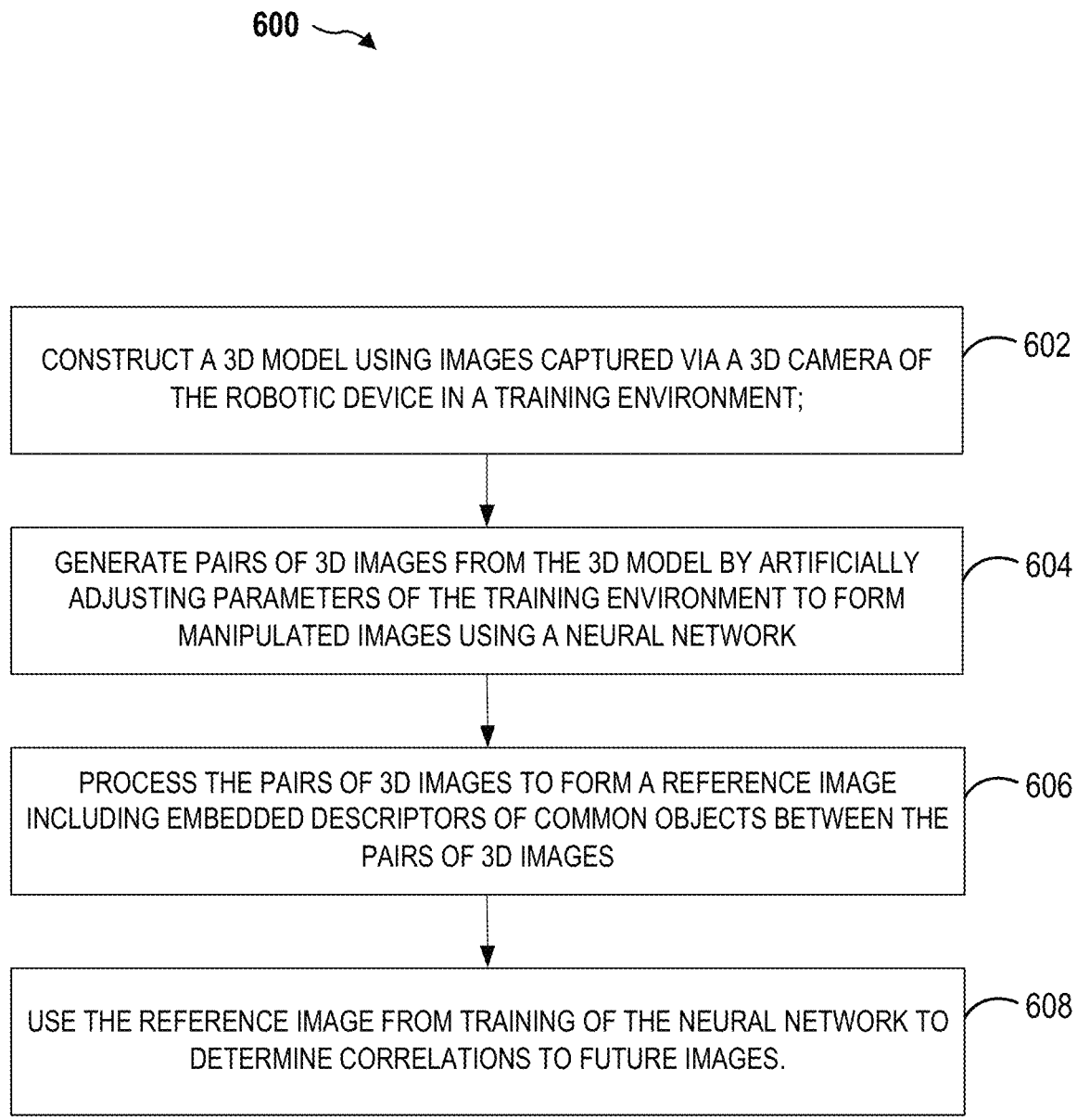
FIG. 6 is a flow chart illustrating a method for training a deep neural network of a robotic device according to aspects of the present disclosure.

FIG. 6 illustrates a flow chart illustrating a method for training a deep neural network of a robotic device according to aspects of the present disclosure. For simplicity, the robotic device will be referred to as a robot.

As shown in FIG. 6 a method 600 begins at block 602, in which a 3D model is constructed using images captured via a 3D camera of the robotic device in a training environment. For example, as shown in FIG. 1, the robot 100 captures the original image 101 of the training environment 102. The objects may be captured via one or more sensors of the robot 100, such as LiDAR, RADAR, and/or an RGB camera. The objects may be observed over a period of time, such as hours, days, etc.

At block 604, pairs of 3D images are generated from the 3D model by artificially adjusting parameters of the training environment to form manipulated images using a neural network. For example, FIG. 3B illustrates the manipulated image 350 showing the handle 332 of the cabinet 330 in a scene where the cabinet 330 is open, which is paired to a scene where the cabinet 330 is closed (e.g., FIG. 3A). This pairing of the original image 300 and the manipulated image 350 links objects together that are the same element but depicted with different (e.g., artificial) articulations.

At block 606, the pairs of 3D images are processed to form a reference image including embedded descriptors of common objects between the pairs of 3D images. For example, FIGS. 4A and 4B illustrate captured images of an unknown environment 402. In one configuration, the robot 100 uses a reference image based on the pairing of original images and manipulated images of a training environment, such as the training environment of the kitchen shown in FIGS. 1, 2, 3A, and 3B. At block 608, the reference image from training of the neural network is used to determine correlations to future images. For example, as shown in FIGS. 4A and 4B, using the reference image, the robot 100 detects the pulled-out chair 406 using a pre-trained object detection neural network. In addition, the reference image enables the robot 100 to detect the open window 408.

According to aspects of the present disclosure, a method for controlling a robotic device based on identification of detected objects in an unknown environment is described. The method includes detecting an object in the unknown environment. For example, as shown in FIG. 4A, the robot 100 detects the utensils 420 and 422 on the table 404. This detection may be performed by selecting a corresponding reference image including embedded descriptors corresponding to trained objects manipulated according to artificially adjusted parameters of an image capture environment.

This method further includes identifying the detected object according to the embedded descriptors of the corresponding reference image. For example, using a pre-trained object detection neural network, the robot 100 is able to track movement of the utensils 420 and 422 and the bottle 410. That is, the bottle 410 moves from the cabinet 430 to the table 404 between FIGS. 4A and 4B. Similarly, the utensils 420 and 422 move from the table 404 to the cabinet 430 between FIGS. 4A and 4B.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for training a deep neural network of a robotic device, comprising:
constructing a 3D model using images captured via a 3D camera of the robotic device in a training environment;

generating pairs of 3D images from the 3D model by artificially adjusting parameters of the training environment to form manipulated images using the deep neural network;

processing the pairs of 3D images to form a reference image including embedded descriptors of common objects between the pairs of 3D images; and using the reference image from training of the neural network to determine correlations to identify detected objects in future images by:

overlaying the corresponding reference image over a captured image of a scene, and determining an identity of the detected object based on a point correspondence between the corresponding reference image and the captured image and the embedded descriptors of the corresponding reference image, in which the embedded descriptors encode information into a series of numbers to provide a numerical fingerprint to differentiate one feature from another.

2. The method of claim 1, in which generating the pairs of 3D images comprises:

pairing 3D images with linked elements; and manipulating linked elements between the pairs of 3D images to create a scene having different object articulations.

3. The method of claim 1, in which artificially adjusting parameters comprises:

varying an object articulation between an original 3D image and a manipulated 3D image.

4. The method of claim 3, in which varying the object articulation comprises:

varying lighting between the original 3D image and the manipulated 3D image.

5. The method of claim 3, in which varying the object articulation comprises:

varying a viewing angle between the original 3D image and the manipulated 3D image.

6. The method of claim 1, further comprising:

identifying objects in an unknown environment that may be manipulated, regardless of deformation, object articulation, angle, and lighting in the unknown environment; and manipulating an identified object.

7. A method for controlling a robotic device based on identification of detected objects in an unknown environment, comprising:

detecting an object in the unknown environment;

selecting a corresponding reference image including embedded descriptors corresponding to trained objects manipulated according to artificially adjusting parameters of an image capture environment; and identifying the detected object according to the embedded descriptors of the corresponding reference image by:

overlaying the corresponding reference image over a captured image of a scene, and determining an identity of the detected object based on a point correspondence between the corresponding reference image and the captured image and the embedded descriptors of the corresponding reference image, in which the embedded descriptors encode information into a series of numbers to provide a numerical fingerprint to differentiate one feature from another.

8. The method of claim 7, further comprising tracking an identified object over a period of time.

9. The method of claim 7, further comprising:

determining an identified object may be manipulated; and manipulating the identified object.

10. A non-transitory computer-readable medium having program code recorded thereon for training a deep neural network of a robotic device, the program code being executed by a processor and comprising:

program code to generate pairs of 3D images from the 3D model by artificially adjusting parameters of a training environment to form manipulated images using the deep neural network;

program code to process the pairs of 3D images to form a reference image including embedded descriptors of common objects between the pairs of 3D images;

program code to use the reference image from training of the neural network to determine correlations to identify detected objects in future images by:

program code to overlay the corresponding reference image over a captured image of a scene, and program code to determine an identity of a detected object based on a point correspondence between the corresponding reference image and the captured image and the embedded descriptors of the corresponding reference image, in which the embedded descriptors encode information into a series of numbers to provide a numerical fingerprint to differentiate one feature from another.

11. The non-transitory computer-readable medium of claim 10, in which the program code to generate the pairs of 3D images comprises:

program code to pair 3D images with linked elements; and program code to manipulate linked elements between the pairs of 3D images to create a scene having different object articulations.

12. The non-transitory computer-readable medium of claim 10, in which the program code to generate the pairs of 3D images comprises:

program code to vary an object articulation between an original 3D image and a manipulated 3D image.

13. The non-transitory computer-readable medium of claim 12, in which the program code to vary the object articulation comprises:

program code to vary lighting between the original 3D image and the manipulated 3D image.

14. The non-transitory computer-readable medium of claim 12, in which the program code to vary the object articulation comprises:

program code to vary a viewing angle between the original 3D image and the manipulated 3D image.

15. A system for controlling a robotic device based on identification of detected objects in an unknown environment, the system comprising:

a pre-trained, object identification module to select a corresponding reference image to identify a detected object in a captured image, the corresponding reference image including embedded descriptors based on trained objects manipulated according to artificially adjusted parameters of an image capture environment, the pre-trained, object identification module to overlay the corresponding reference image over the captured image of a scene, and to determine an identity of the detected object based on a point correspondence between the corresponding reference image and the captured image and the embedded descriptors of the corresponding reference image, in which the embedded descriptors encode information into a series of numbers to provide a numerical fingerprint to differentiate one feature from another; and a controller to select an autonomous behavior of the robotic device based on an identity of the detected object.

16. The system of claim 15, in which the pre-trained, object identification module to track an identified object over a period of time.

17. The system of claim 15, in which the controller is further to manipulate an identified object.

18. The system of claim 15, in which the pre-trained, object identification module to detect common objects between the corresponding reference image and the captured image based on correlations to identify the detected object in future images.

* * * * *